N. F. CHAMBERLIN.
LOCK NUT.
APPLICATION FILED FEB. 24, 1910.
976,847.
Patented Nov. 29, 1910.
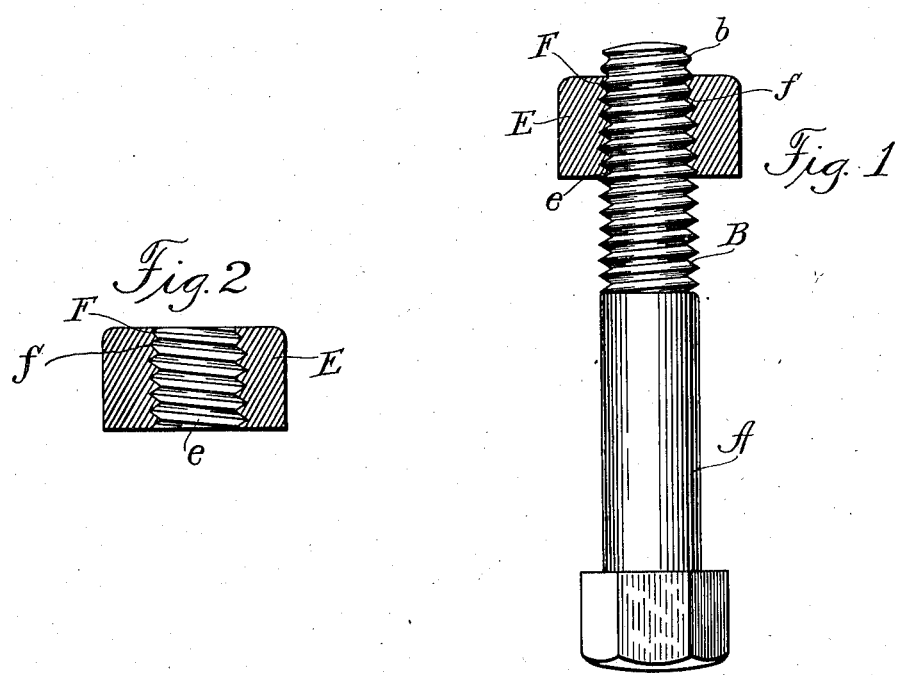
Witnesses
R. C. Balinger.
Edwin Guthrie
Inventor
Newton F. Chamberlin.
By Jos. A. Burkart,
Attorney

UNITED STATES PATENT OFFICE.

NEWTON F. CHAMBERLIN, OF LIBERTYVILLE, ILLINOIS, ASSIGNOR OF ONE-HALF TO J. MAY MORRISON, OF BETHESDA, MARYLAND.

LOCK-NUT.

976,847.  Specification of Letters Patent.  Patented Nov. 29, 1910.

Application filed February 24, 1910. Serial No. 545,641.

*To all whom it may concern:*

Be it known that I, NEWTON F. CHAMBERLIN, citizen of the United States, residing at Libertyville, in the county of Lake and State of Illinois, have invented certain new and useful Improvements in Lock-Nuts, of which the following is a specification.

This invention relates to lock nuts, that is to say, to nuts which have a peculiar construction of the whole or of a part, whereby the threads of a bolt are engaged with a binding effect, serving to retain the nut upon the bolt against displacement by jars or accidental blows incidental to the use of the structure to which the bolt is applied.

The object of this invention is the production of a lock nut having special construction and particular arrangement of a portion of its internal threads, whereby it is believed to be more securely held to a bolt after being applied thereto, than is the case with any other nut in the same class or of the same type with which I am acquainted.

A further constructional advantage of this invention consists in the fact that it may be used more than once. In other words, it may be removed by the exertion of sufficient force with a wrench, and may be replaced upon the same bolt, the locking or securing effect being substantially the same as before.

The construction and arrangement of parts comprising this invention are illustrated in the accompanying drawings, of which—

Figure 1 represents a side view of a bolt with this invention, shown in section, applied. Fig. 2 is a vertical section of this invention detached, showing the interior before being applied to a bolt.

As shown in Fig. 1, it will be noted that the bolt A has its upper threads, $b$, crushed and reformed by the application of the nut E. The regular or normal threads of the nut are marked $e$, and, for example, two or more threads of the nut near the top are designated by the reference letters F and $f$. Attention is also called to the fact that of those threads, the upper thread F is less in diameter than the next lower or intermediate thread $f$, and that the intermediate thread is less in diameter than the normal threads $e$. In other words, the threads at the top of the nut differ in diameter from each other and from the normal threads of the nut, as shown in Fig. 2.

It requires three taps to fashion this invention. The nut being first suitably drilled, one tap is employed to form the topmost thread or threads F, and a second tap is taken to form the next lower or intermediate thread or threads $f$, and still a third tap is used to cut the normal threads $e$ of the nut. The nut is not split or slotted in any way. It is a solid nut.

When a nut constructed in accordance with this invention is applied to a bolt, the threads of the bolt and of the nut as well, so far as regards the upper threads F and intermediate threads $f$, are reformed in such manner that those variant threads of the nut make contact throughout their extent with the threads of the bolt which they engage. It is by reason of the considerable length of the jamming contact thus brought about that the nut is securely held in place.

After the nut has once been applied to a bolt, it may be removed by the exertion of sufficient force with a wrench, and it may be again applied. It has been found that upon again being made tight, the grasp of the nut upon the threads of the bolt is substantially the same as before. The nut may be likewise applied to a new bolt, with even greater binding or securing effect as the result.

Having now described my invention and explained the mode of its operation, what I claim is:—

A lock nut, comprising a nut and bolt formed of metal in the same condition as to hardness, the said nut having lower and normal threads, intermediate threads arranged above and in continuation of the said normal threads, the said intermediate threads being less in diameter than said normal threads, and upper threads arranged above and in continuation of said intermediate threads, and the said upper threads being less in diameter than the said intermediate threads, whereby the threads of nut and bolt are equally reformed when the nut is applied.

In testimony whereof I affix my signature in presence of two witnesses.

NEWTON F. CHAMBERLIN.

Witnesses:
HORACE R. GEORGE,
EDWIN GUTHRIE.